United States Patent [19]
Fisher

[11] 3,879,570
[45] Apr. 22, 1975

[54] DRY ROASTING MILO
[76] Inventor: Merritt J. Fisher, 160 West 6th Ave. North, Clear Lake, Iowa 50428
[22] Filed: Sept. 4, 1973
[21] Appl. No.: 394,392

[52] U.S. Cl. ............................ 426/466; 426/519
[51] Int. Cl. .......................................... A23l 1/36
[58] Field of Search ......... 426/466, 462, 467, 469, 426/519

[56] References Cited
UNITED STATES PATENTS
2,307,710  1/1943  Polin et al. ..................... 426/466
2,505,325  4/1950  Hubbard ......................... 426/466
2,887,383  5/1959  Kopf .............................. 426/466
3,528,815  9/1970  Trotter ........................... 426/510

Primary Examiner—Norman Yudkoff
Assistant Examiner—Curtis P. Ribando
Attorney, Agent, or Firm—Zarley, McKee, Thomte & Voorhees

[57] ABSTRACT

Dry roasting of milo by a method which avoids popping of the grain. The milo is dry roasted by indirect heating within a roasting zone which is free from an available air intake means and results in dry roasted grain with only a very small percentage of that grain being in popped form.

12 Claims, No Drawings

DRY ROASTING MILO

BACKGROUND OF THE INVENTION

Milo is a sorghum grain having white, yellow or pink seeds. It has value as a nutritional animal feed. The nutritional level of milo and other grains as well is increased, for purposes of feeding to animals, by roasting the grain prior to livestock feeding. The advantages of feeding roasted grain are known. For example, some university tests have shown that livestock fed roasted grains will have from 9% to 16% faster weight gain. In addition, grains such as milo which have been roasted are more palatable and more fully digestible by livestock. While the advantages in roasting grains for feeding to livestock have heretofore been known, the roasting of milo has met with some difficulty.

Milo when roasted becomes very sticky making subsequent processing and utilization quite difficult. In addition, milo often pops much like popcorn when roasted. Popped grains are not liked by those who feed livestock because after popping the feed bulk density has been greatly increased. Thus the feed is more bulky, requires more room during storage and transportation, and generally results in less efficient livestock feeding processes.

The process of this invention provides a method for dry roasting of milo in a manner which avoids problems normally associated with high temperature heating of milo caused by its inherent stickiness. Additionally, the process of this invention provides a method of dry roasting milo which substantially eliminates the problems caused by the grain popping during roasting. In accord with the process of this invention, popping of the grain can be kept to a minimal level and always below the level of 10%.

Accordingly, one object of this invention is to provide a process of dry roasting milo which avoids the inherent stickiness problems normally associated with high temperature heating of milo.

Yet another object of this invention is to dry roast milo in a manner which substantially eliminates popping of the grain during roasting and therefore results in a grain which can be subsequently fed to livestock in a most efficient manner.

The method of accomplishing these and other objects will become apparent from the following description of the invention.

SUMMARY OF THE INVENTION.

In accord with the process of this invention milo, having only its natural moisture content, is introduced into a heating zone which is free from air intake means. The milo is agitated within the heating zone and while being agitated, it is heated by indirect heating means to a temperature of at least 750° fahrenheit. Thereafter, the grain is withdrawn from the heating zone and has only a very small percentage of popped kernels.

DETAILED DESCRIPTION OF THE INVENTION

As heretofore stated, milo is a known animal feed. In addition, the advantages of roast grains, including milo, are known. It generally provides for a more efficient means of feeding grains to livestock and for increased palatability levels for the grain. However, certain deficiencies with regard to the roasting of milo, normally associated with the roasting of that grain, have heretofore been set forth. The process of this invention dry roasts milo in a manner which avoids the inherent stickiness problems and in a manner which eliminates the normal tendency of milo to pop during roasting.

It should be noted at the outset that the process of this invention is wholly distinct from a process of cooking milo and other grains. Cooking, as opposed to dry roasting, implies that cooking in a vessel, usually under pressure, usually in the presence of added moisture, and usually at temperatures less than 500° fahrenheit. The result is a product which has absorbed much moisture, which has often degenerated into a starchy condition, and which is usually wholly uncharacteristic of the original grain itself. Examples of patents showing that cooking of grains for animal feed are Bookwalter, U.S. Pat. No. 3,579,372; Hirahara, U.S. Pat. No. 3,471,298; Trotter, U.S. Pat. No. 3,528,815; and, Hickey, U.S. Pat. No. 3,336,137.

In accord with the process of this invention milo is introduced into a heating zone which is characterized by being free from available air intake means. The closing off of the heating zone from available sources of air intake is very important to the process of this invention. It is believed to be the reason that allows the grain to be dry roasted without substantial amounts of kernel popping occurring. For example, if milo is roasted in a conventional popper, much like a corn popper, and that popper has an available source of oxygen from the surrounding atmosphere, the grain will pop during roasting. The result is popped milo which has all the disadvantages heretofore enumerated. However, if the roasting zone, or heating zone, the two terms being utilized interchangeably herein, is not exposed to available oxygen from the atmosphere, roasting can occur without popping of the grain.

The precise vessels or chambers utilized to provide the heating or roasting zone is not important, provided that said chamber, vessel or zone does not have a readily available exposure to air in the atmosphere. Of course, air is rapidly taken on by the grain during the roasting process because of the consumption of oxygen during roasting. Thus available air must not be provided access to the heating zone, or roasting zone, or chamber or vessel. Examples of suitable vessels can be stainless steel drum means which is closed off from the atmosphere, a cylindrical elongated tubular chamber, and the like.

As will be hereafter explained in greater detail, it is important to the process of this invention that the grain be continually agitated during the roasting process. If the grain is not agitated during the roasting process, because of the high temperatures employed, it will become scorched or burned. Agitation can be accomplished by well known means. For example, if the heating zone is a cylindrical tubular member, agitation can be accomplished by conveying the grain through that heating zone by utilization of an auger means. The auger means will provide continual movement of the grain and accordingly, provides the necessary agitation. However, other mechanical means of accomplishing agitating can be utilized. For example, a fluidized bed cound be utilized.

The milo while being agitated is subjected to indirect heating to a temperature of at least 750° fahrenheit. Preferably the temperature is within the range of from 750° fahrenheit to 900° fahrenheit. Most preferably the temperature is within the range of from 800° fahrenheit to 900° fahrenheit. Generally, temperatures in excess of 900° should be avoided because higher temperatures will have a tendency to begin burning the grain and the grain will reach what is often referred to in the art as a carmelized stage. A minimum temperature of at least 750° fahrenheit is essential in order to provide a complete roasting of the grain.

In order to avoid popping of the grain at these unusually high roasting temperatures, it has been found essential to the process of this invention that the heating means be an indirect heating means. For example, if a roasting device which allows direct exposure of the grain to high temperature flame is employed, the grain will most certainly pop. Thus in accord with the process of this invention, the heat is applied directly to the heating zone and the grain therein is heated by conductive means. For example, if the heating zone is a rotating drum, the high temperature flame is applied to the outside of the drum with the inside being heated by conduction. It is in this sense that the term "indirect heating means" is utilized herein. However, it should be understood that the term indirect heating means is not limited to this specific example provided herein. Other means besides that mentioned herein could equally well be employed.

Also important to the process of this invention is that no added moisture should be utilized in the process. If excessive moisture is added to the grain, because of the high temperatures employed, a steam atmosphere is developed within the heating zone and as a result the milo is steamed and cooked. Thus no moisture should be present other than the natural moisture content of the grain itself. For milo obtained from arrid sections of the country the natural moisture content is generally 10% or below. For milo obtained from sections of the country of intermediate wetness levels, the grain may have a moisture content of from 10 to 14%. On the other hand, for areas of the country where much available moisture occurs, the grain may have a high moisture content ranging up to as much as 18% by weight. Very little grain, in its natural condition, will have a moisture content above 18%. It is preferred for the process of this invention that the milo have a moisture content of 10% or less. Thus, if desired, a preliminary very mild heating step can occur to drive excessive moisture out of and away from the milo.

Because of the high temperatures employed in the process of this invention, the dry roast is a very quick roast. For example, in most cases, roasting is completed in a maximum of two minutes. Excessively long roasting time should be avoided because the grain will scorch, burn or carmelize at the high temperatures employed. Generally up to two minutes will provide sufficient roasting time. Of course, this will depend upon the quantity of grain being roasted, the size and efficiency of the heating vessel as well as the heat conducting efficiency of the vessel being employed.

The process of this invention can be employed equally satisfactory by a continuous process means, for example, by utilization of a cylindrical tube-like heating zone utilizing an auger conveyor to convey the milo into and through the heating zone and withdrawing it from the opposite end. Utilization of a cylindrical heating chamber with an auger means has the advantage in that it can be conducted continuously since the auger will close the heating zone from its atmospheric environment and thus prevent excessive air intake. On the other hand, a batch process can be employed satisfactorily. For example, batches of milo having only its natural moisture content, can be placed in a closed vessel and agitated by tumbling the vessel or the like while heating the vessel by direct flame contact to provide temperatures within the heated vessel up to at least 750° fahrenheit. The following example is offered to further illustrate but not limit the process of this invention.

EXAMPLE

Three hundred pounds of milo having a moisture content of 11% is obtained. The heating zone employed in this example is an 8-foot cylindrical tube having a 14-inch diameter. Inside of the tube, in order to provide agitation of the milo during heating is a conventional auger conveyor means. The tube is heated to a temperature of 800° fahrenheit by a series of jets of a natural gas burner. The burner is a one and one-half million B.T.U. burner. The milo is conveyed into the heating zone by the auger means at a rate of 1 to 9/tn/hr. The heating zone is free from contact with available air intake means. Thus additional oxygen cannot be consumed within the heating or roasting zone. The milo is conveyed through the heating zone which is providing heat at a temperature of 800° fahrenheit. During this entire roasting operation the grain is continually being agitated by the motion of the auger. The grain travels completely through the heating zone in two minutes. It is withdrawn from the heating zone, examined, and noted to have a dark pinkish color. The percentage of popped kernels was less than 10% and was approximately 5 %.

Equivalent results to those provided in this example can be obtained when the temperature employed is 750° fahrenheit and 900° fahrenheit. Temperatures in excess of 900° fahrenheit provided some scorching, some burning and some carmelization of the milo.

Like results are obtained when a batch process and batch vessel is utilized as opposed to the continuous process and continuous vessel described herein.

It should be noted that in accord with the process described in this example as well as the remaining portions of the specification, that no applied pressure other than the pressure naturally building up within the heating zone, is utilized. It has been found that utilization of greater pressures is not advantageous in that the grain when released from the heating or roasting zone may have a tendency to pop.

What is claimed is:

1. A method of dry roasting milo in which only a small percentage of the kernels are popped and which avoids the inherent stickiness of milo normally associated with high temperature heating of milo, said method comprising introducing milo having a natural moisture content of about 18% or less into a heating zone, preventing substantial air intake into said zone, agitating said milo, and while agitating, heating said zone by indirect heating means to a temperature of at least 750° fahrenheit but below the scorching and caramelizing temperature of said milo, for a time sufficient to dry roast said milo, but prevent the scorching thereof, and withdrawing from said zone said dry roasted milo having only a small percentage of popped kernels.

2. The method of claim 1 wherein the temperature is at least 800° fahrenheit.

3. The method of claim 2 wherein the temperature does not exceed 900° fahrenheit.

4. The method of claim 1 wherein said milo is heated for a maximum of 2 minutes.

5. The method of claim 1 wherein said heating zone is a cylindrical chamber, and wherein agitation is accomplished by auger conveying means.

6. The method of claim 1 wherein the only moisture present is the natural moisture content of the milo.

7. The method of claim 6 wherein in the moisture content is from 10% to 14%.

8. The method of claim 1 where the milo moisture content ranges from 10% to 18% by weight.

9. The method of claim 1 wherein the process is a continuous process.

10. The method of claim 1 wherein the process is a batch process.

11. The method of claim 1 wherein said milo has a moisture content of 10% or less.

12. The method of claim 1 wherein an initial mild heating step is employed to drive the moisture content of said milo to 10% or less.

* * * * *